May 23, 1933.   H. J. KALAJIAN   1,910,394
CLUTCH
Filed Dec. 4, 1930   2 Sheets-Sheet 1
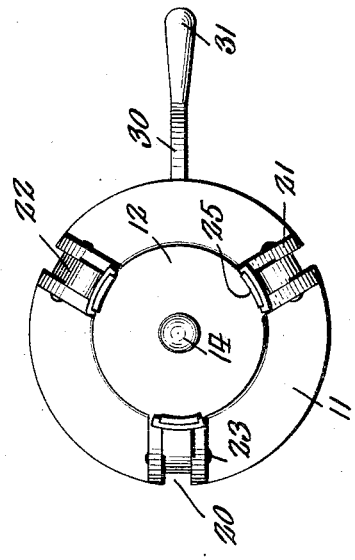
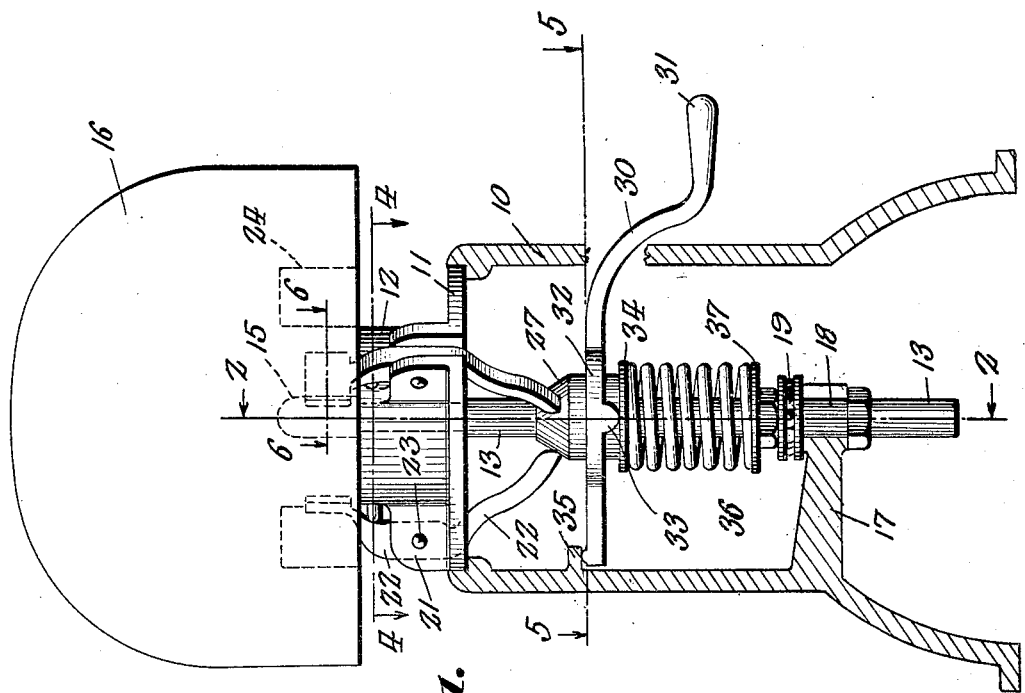
Harry J. Kalajian,
INVENTOR
BY Victor J. Evans
and A. L. Evans ATTORNEYS May 23, 1933.  H. J. KALAJIAN  1,910,394
CLUTCH
Filed Dec. 4, 1930  2 Sheets-Sheet 2
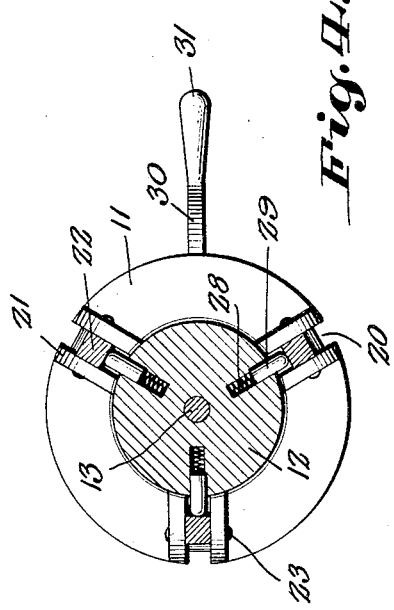
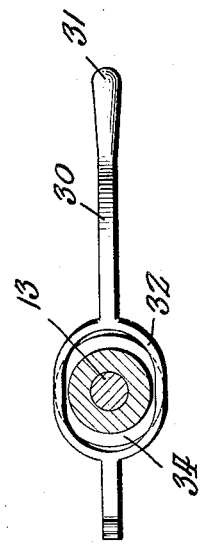
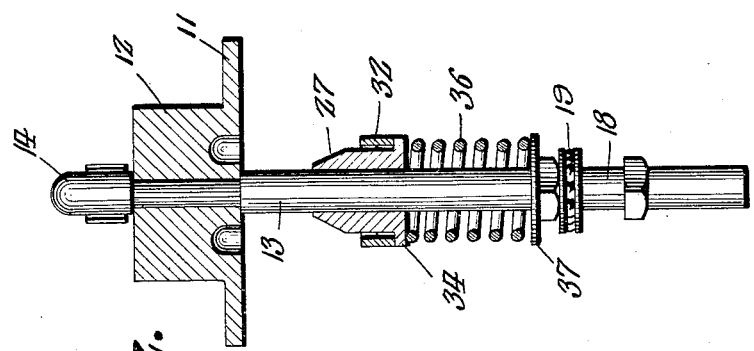
Harry J. Kalajian,
INVENTOR
BY Victor J. Evans
and A. L. Evans ATTORNEYS Patented May 23, 1933

1,910,394

UNITED STATES PATENT OFFICE

HARRY J. KALAJIAN, OF DETROIT, MICHIGAN

CLUTCH

Application filed December 4, 1930. Serial No. 500,101.

This invention relates to hat blocking machines and has especial reference to means for controlling the operation of a radial crown block of the usual type, an object being to provide a clutch which may be operated while the block is rotating, and which will securely hold the block upon the shaft.

Another object of the invention is the provision of a clutch which is simple in construction, positive in operation, and in which the parts are protected from dust, dirt, etc.

With the above and other objects in view, the invention further includes the following novel features and details of construction, to be hereinafter more fully described, illustrated in the accompanying drawings and pointed out in the appended claim.

In the drawings:—

Figure 1 is a side elevation partly in section illustrating a clutch for hat blocks constructed in accordance with my invention.

Figure 2 is a section on the line 2—2 of Figure 1.

Figure 3 is a top plan view of the invention.

Figures 4, 5 and 6 are sectional views taken respectively on the lines 4—4, 5—5 and 6—6 of Figure 1, the housing being omitted.

Referring to the drawings in detail wherein like characters of reference denote corresponding parts, the reference character 10 indicates the clutch housing which is provided with a top 11, from which extends a centrally arranged hub 12. A vertically disposed shaft 13 mounted within the housing extends through the hub 12 and is provided with a head 14 which is receivable within a socket 15 provided centrally in a crown hat block 16. The hub 12 provides a bearing for the upper end of the shaft 13, while an arm 17 which extends inwardly from one wall of the housing provides a bearing 18 for the opposite end of the shaft. An anti-friction thrust bearing 19 acts to support the shaft.

The top 11 is radially slotted as shown at 20 and rising from opposite edges of these slots are spaced pairs of ears 21, between which are mounted clutch arms 22, upon pivot pins 23. These arms extend upward into a channel 24 provided in the block 16 and carry friction shoes 25 which frictionally engage the inner wall of the channel. These shoes are removably attached by means of screws 26 or other fastening means.

The opposite ends of the arms 22 extend downward within the housing 10 and engage a tapered collar 27 which is slidable upon the shaft 13. By reference to Figure 1 of the drawings it will be seen that when this collar 27 is moved upward, the upper or inner ends of the arms 22 will be forced inward into clutching engagement. In order to disengage the arms, the hub 12 is provided with radial slots 28 within which operate spring influenced pins or plungers 29, the outer ends of the latter engaging the arms 22 above the pivot pins 23. Thus, when the collar 27 is lowered, these pins or plungers 29 will force the clutch arms into disengaged position.

The reference character 30 indicates an operating lever whose handle 31 extends upon the outside of the casing. The lever 30 is provided with a yoke-like portion 32 which surrounds the collar 27 and which is provided with spaced lugs 33, bearing upon a flange 34 at the lower end of the collar 27. The lever 30 is fulcrumed against a projection 35 located within the housing. A spring 36 surrounds the shaft 13 and bears against the flange 34 and against a washer 37 at the top of the thrust bearing 19. By depressing the outer end of the lever 30, the clutch may be disengaged, while the spring 36 will automatically engage the clutch when pressure upon the lever is released.

The invention is susceptible of various changes in its form, proportions and minor details of construction and the right is herein reserved to make such changes as properly fall within the scope of the appended claim.

Having described the invention what is claimed is:—

A clutch for hat blocks comprising a vertically arranged casing, a top supported by the upper end of the casing and having a centrally located apertured enlargement, a shaft journaled in the enlargement with one end attached to a hat block, spring pressed clutch elements pivoted to the top for engagement with the hat block, a flanged clutch member slidable and rotatable on the shaft to engage the elements for forcing the latter to grip the hat block, an arm on the casing, a journal on the arm to rotatably support the shaft, a thrust bearing on the shaft and engaging the journal, a coil spring on the shaft and acting against the thrust bearing and the clutch member to urge the latter in a direction to operate the clutch elements, a lever extending through the casing, a lug on the casing and acting as a fulcrum for one end of the lever, a yoke portion on the lever and surrounding the clutch member, and fulcrumed lugs on the yoke portion and bearing against the flanged portion of the clutch member to move the latter against the action of the spring by a downward movement of the free end of said lever.

In testimony whereof I affix my signature.

HARRY J. KALAJIAN.